(12) United States Patent
Charintranond et al.

(10) Patent No.: US 11,994,056 B1
(45) Date of Patent: *May 28, 2024

(54) LOGIC FOR IMPROVED DELTA PRESSURE BASED SOOT ESTIMATION ON LOW RESTRICTION PARTICULATE FILTERS

(71) Applicant: International Engine Intellectual Property Company, LLC, Lisle, IL (US)

(72) Inventors: Paul Boon Charintranond, Palatine, IL (US); Navtej Singh, Arlington Heights, IL (US)

(73) Assignee: International Engine Intellectual Property Company, LLC, Lisle, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/118,290

(22) Filed: Mar. 7, 2023

(51) Int. Cl.
*F01N 9/00* (2006.01)
*B60K 13/04* (2006.01)
(Continued)

(52) U.S. Cl.
CPC .............. *F01N 9/002* (2013.01); *B60K 13/04* (2013.01); *F01N 3/0232* (2013.01); *F01N 3/0253* (2013.01); *F01N 3/035* (2013.01); *F01N 3/0821* (2013.01); *F01N 3/36* (2013.01); *F01N 13/0097* (2014.06); *F01N 3/023* (2013.01); *F01N 3/0233* (2013.01); *F01N 3/2093* (2013.01); *F01N 9/005* (2013.01); *F01N 9/007* (2013.01); *F01N 11/005* (2013.01); *F01N 11/007* (2013.01);

*F01N 2250/02* (2013.01); *F01N 2410/04* (2013.01); *F01N 2430/08* (2013.01); *F01N 2560/07* (2013.01); *F01N 2610/03* (2013.01); *F01N 2610/148* (2013.01);
(Continued)

(58) Field of Classification Search
CPC combination set(s) only.
See application file for complete search history.

(56) References Cited

U.S. PATENT DOCUMENTS 6,574,956 B1 * 6/2003 Moraal ............... F02D 41/0052
60/297
6,722,121 B2 4/2004 Gui et al.
(Continued)

*Primary Examiner* — Binh Q Tran
(74) *Attorney, Agent, or Firm* — Mark C. Bach; Umang Khanna

(57) ABSTRACT

Estimating soot comprises connecting exhaust pipe to engine, exhaust pipe has diesel oxidation catalyst and diesel particulate filter. Fuel injector is connected to exhaust pipe upstream from diesel oxidation catalyst and diesel particulate filter. Delta exhaust pressure sensor measures difference in exhaust pressure at inlet and outlet to diesel particulate filter. Controller is connected to fuel injector and to delta exhaust pressure sensor. Controller determines when to conduct active regeneration of diesel particulate filter based on estimated amount of soot accumulated therein. Controller, in first regeneration mode, causes fuel injector to inject fuel at first rate into exhaust stream, and re-evaluates soot accumulated within diesel particulate filter under increased volumetric flow of exhaust stream. Controller, in second regeneration mode, causes fuel injector to inject fuel at second rate, larger than first rate, into exhaust stream to combust soot trapped in diesel particulate filter.

6 Claims, 3 Drawing Sheets

(51) Int. Cl.
   *F01N 3/023* (2006.01)
   *F01N 3/025* (2006.01)
   *F01N 3/035* (2006.01)
   *F01N 3/08* (2006.01)
   *F01N 3/20* (2006.01)
   *F01N 3/36* (2006.01)
   *F01N 11/00* (2006.01)
   *F01N 13/00* (2010.01)

(52) U.S. Cl.
   CPC .......... *F01N 2900/0408* (2013.01); *F01N 2900/0601* (2013.01); *F01N 2900/10* (2013.01); *F01N 2900/1406* (2013.01); *F01N 2900/1411* (2013.01); *F01N 2900/1602* (2013.01); *F01N 2900/1611* (2013.01); *F01N 2900/1808* (2013.01)

(56) References Cited

U.S. PATENT DOCUMENTS

| | | | |
|---|---|---|---|
| 6,826,905 B2 | 12/2004 | Gui et al. | |
| 6,829,890 B2 | 12/2004 | Gui et al. | |
| 6,978,604 B2 | 12/2005 | Wang et al. | |
| 7,047,730 B2 | 5/2006 | Wang et al. | |
| 7,191,591 B2 | 3/2007 | Zhang et al. | |
| 7,296,402 B1 | 11/2007 | Cook | |
| 7,299,626 B2 | 11/2007 | Barasa et al. | |
| 7,353,648 B2 | 4/2008 | Zhang | |
| 7,392,652 B2 | 7/2008 | Heath | |
| 7,433,776 B1 | 10/2008 | Hunter et al. | |
| 7,484,503 B2 | 2/2009 | Wyatt et al. | |
| 7,530,220 B2 | 5/2009 | Miller et al. | |
| 7,536,853 B2 | 5/2009 | Cook et al. | |
| 7,685,815 B2 | 3/2010 | Gudorf | |
| 7,698,888 B2 | 4/2010 | Wyatt | |
| 7,716,922 B2 | 5/2010 | Ehlers | |
| 7,721,536 B2 | 5/2010 | Bradley et al. | |
| 7,793,492 B2 | 9/2010 | Abraham et al. | |
| 8,151,556 B2 | 4/2012 | Oriet et al. | |
| 8,171,721 B2 | 5/2012 | Boddy et al. | |
| 8,209,960 B2 | 7/2012 | Shamis et al. | |
| 8,261,539 B2 | 9/2012 | Abraham et al. | |
| 8,266,890 B2 | 9/2012 | Singh | |
| 8,291,696 B2 | 10/2012 | Makartchouk | |
| 8,297,043 B2 | 10/2012 | Cizeron et al. | |
| 8,302,387 B2 | 11/2012 | Santhanam et al. | |
| 8,306,710 B2 | 11/2012 | Beaucaire et al. | |
| 8,307,630 B2 | 11/2012 | Askew | |
| 8,307,632 B2 | 11/2012 | Berke et al. | |
| 8,356,474 B2 | 1/2013 | Reuter et al. | |
| 8,381,519 B2 | 2/2013 | Singh et al. | |
| 8,434,298 B2 | 5/2013 | Adelman et al. | |
| 8,434,299 B2 | 5/2013 | Gui et al. | |
| 8,479,499 B2 | 7/2013 | Berke et al. | |
| 8,479,501 B2 | 7/2013 | McCarthy, Jr. | |
| 8,551,432 B2 | 10/2013 | Adelman et al. | |
| 8,635,856 B2 | 1/2014 | Beaucaire et al. | |
| 8,701,390 B2 | 4/2014 | Chimner et al. | |
| 8,940,260 B2 | 1/2015 | Derybowski et al. | |
| 9,021,790 B2 | 5/2015 | Boyd et al. | |
| 2005/0188686 A1* | 9/2005 | Saito | F01N 13/008 60/297 |
| 2006/0101810 A1 | 5/2006 | Angelo et al. | |
| 2007/0256410 A1 | 11/2007 | Cook | |
| 2007/0289292 A1 | 12/2007 | Cook et al. | |
| 2008/0028750 A1 | 2/2008 | Zukouski et al. | |
| 2008/0092525 A1 | 4/2008 | Ehlers | |
| 2008/0154478 A1 | 6/2008 | Lyons | |
| 2008/0184696 A1 | 6/2008 | Wyatt | |
| 2009/0090099 A1 | 4/2009 | Wu et al. | |
| 2009/0217647 A1* | 9/2009 | Daneau | F01N 3/0253 60/297 |
| 2010/0083641 A1 | 4/2010 | Makartchouk | |
| 2011/0023460 A1 | 2/2011 | Singh | |
| 2011/0023469 A1 | 2/2011 | Berke et al. | |
| 2011/0047969 A1 | 3/2011 | Berke et al. | |
| 2011/0072805 A1 | 3/2011 | Horner et al. | |
| 2011/0083428 A1 | 4/2011 | Makartchouk | |
| 2011/0088374 A1 | 4/2011 | Johnson | |
| 2011/0099974 A1 | 5/2011 | Griffin | |
| 2011/0099997 A1 | 5/2011 | Singh et al. | |
| 2011/0120123 A1 | 5/2011 | Dickerson et al. | |
| 2011/0126524 A1 | 6/2011 | Askew | |
| 2011/0197568 A1 | 8/2011 | Beaucaire et al. | |
| 2011/0214963 A1* | 9/2011 | Beylotte | F16D 41/16 192/106 R |
| 2011/0252765 A1 | 10/2011 | Makartchouk et al. | |
| 2011/0257821 A1 | 10/2011 | Beaucaire et al. | |
| 2012/0247089 A1 | 10/2012 | Griffin et al. | |
| 2013/0205757 A1 | 8/2013 | Boyd et al. | |
| 2014/0208720 A1 | 7/2014 | Strots et al. | |
| 2014/0260210 A1 | 9/2014 | Kelso et al. | |
| 2014/0325964 A1 | 11/2014 | Wacker et al. | |
| 2014/0360169 A1 | 12/2014 | Lack | |
| 2015/0052879 A1 | 2/2015 | Kelso et al. | |
| 2015/0113961 A1 | 4/2015 | de Ojeda et al. | |
| 2015/0240696 A1* | 8/2015 | Saitou | F02D 41/148 73/114.76 |
| 2016/0061079 A1* | 3/2016 | Wentzel | F01N 3/208 60/287 |
| 2019/0234285 A1* | 8/2019 | Di Martino | F01N 9/005 |

* cited by examiner

LOGIC FOR IMPROVED DELTA PRESSURE BASED SOOT ESTIMATION ON LOW RESTRICTION PARTICULATE FILTERS

BACKGROUND

This disclosure relates to an apparatus and method for controlling regeneration of a diesel particulate filter. Specifically, this disclosure relates to apparatus and method for validating soot estimation for determining when to regenerate a diesel particulate filter.

RELATED ART

Vehicles, such as those equipped with diesel engines, may include exhaust systems that have diesel particulate filters for removing particulate matter from the exhaust stream. During use of the diesel particulate filter, soot or other carbon-based particulate matter accumulates on the filter. As particulate matter accumulates on the diesel particulate filter, restriction of the filter increases, causing buildup of undesirable back pressure in the exhaust system. Increased back pressure decreases engine efficiency and reduces engine performance. Therefore, to prevent diesel particulate filters from becoming excessively loaded with particulates, diesel particulate filters are regularly regenerated by burning off (i.e., oxidizing) the particulates that accumulate on the filters. Under most diesel engine operating conditions, however, the engine exhaust temperature is too low to cause the diesel particulate filter to completely regenerate without assistance. Thus, it is desirable to provide a means for assisting regeneration of the diesel particulate filter.

There are a number of known methods for regenerating diesel particulate filters. One known method is to provide a diesel oxidation catalyst in the exhaust system downstream of the engine exhaust outlet and prior to the diesel particulate filter, and to operate the engine fuel injection apparatus so as to inject a quantity of fuel late in the combustion stroke of the engine piston. This causes the unburned fuel to reach the diesel oxidation catalyst and be burned off in a catalyzed reaction using the diesel oxidation catalyst so as to raise the exhaust temperature sufficiently to initiate regeneration of the diesel particulate filter without substantially increasing the engine output torque. Similarly, fuel may be injected directly into the exhaust stream upstream of the diesel oxidation catalyst using a fuel delivery device. An example of such a system is disclosed in U.S. published application U.S. 2006/0101810, published May 18, 2006, which is herein incorporated by reference in its entirety. Alternatively, it is known to heat a diesel particulate filter to a temperature sufficient to initiate regeneration using an electrical heating element.

Although these systems are generally effective for initiating regeneration of a diesel particulate filter, each has certain drawbacks in application. One drawback is that regenerating the diesel particulate filter is fuel and energy intensive, resulting in reduced overall fuel and energy efficiency of the vehicle. Specifically, in a vehicle that uses unburned fuel from either late fuel injection into the combustion stroke of the engine piston, or in a vehicle that injects fuel directly into the exhaust stream, excess fuel must be consumed in the diesel particulate filter regeneration process. This manifests as decreased overall fuel economy, which is neither economically nor environmentally desirable. Even in a vehicle that uses an electrical heating element to regenerate the diesel particulate filter, the electrical power necessary to operate the heating element must be provided by the vehicle's electrical system. Producing that extra electrical power requires that the vehicle engine provide additional power to the vehicle electrical generator, either as the electrical energy is being used, or to return the vehicle batteries to a full state of charge if the batteries are used to provide the necessary electrical energy. The additional power provided by the vehicle engine to the vehicle generator again manifests as decreased overall fuel economy.

In order to reduce unnecessary or premature regeneration of the diesel particulate filter, various methods and approaches are known for determining the level or amount of soot in a diesel particulate filter, and for determining the appropriate point in time to initiate regeneration of the diesel particulate filter. Since it takes excess fuel and energy consumption to actively regenerate a diesel particulate filter, a system in which a diesel particulate filter regenerates too frequently may result in unnecessary excess fuel and energy consumption, and therefore reduced fuel economy due to the excess fuel and energy used to burn off the soot from the diesel particulate filter. Conversely, a system in which the diesel particulate filter is not regenerated frequently enough may cause excess back pressure in the exhaust, which may also result in reduced fuel economy. Therefore, it is important to regenerate the diesel particulate filter only when necessary to prevent excess back pressure in the exhaust throughout its operating range.

The use of low restriction diesel particulate filters makes it even harder to accurately estimate the quantity of soot trapped by the diesel particulate filter, especially during low exhaust flow operating cycles. The advantage of using low restriction diesel particulate filters, of course, is that their reduced exhaust flow restriction facilitates greater overall efficiency and fuel mileage. This advantage is reduced when the diesel particulate filter is allowed to accumulate excessive soot due to the reduced ability to estimate the amount of soot present and to determine the appropriate point in time to initiate regeneration of the diesel particulate filter. Furthermore, a reduced ability to estimate the amount of soot present in the diesel particulate filter can lead to progressive failure of the diesel particulate filter, either during ordinary operation or during the regeneration process. Specifically, diesel particulate filters may be designed to withstand ordinary operation and normal regeneration events, whereas an overly clogged diesel particulate filter may exceed the thermal tolerance of the diesel particulate filter during regeneration events.

Premature deterioration and/or failure of the diesel particulate filter may result in the vehicle failing to meet emissions requirements, and may result in increased warranty costs to original equipment manufacturers. While it is known to mitigate the possibility of such deterioration and/or failure of the diesel particulate filter by way of hardware selection, in particular choosing a diesel particulate filter that can withstand higher temperatures and temperature gradients, the use of diesel particulate filters having such qualities adds significant cost to the vehicle.

Since improving fuel economy is desired, and in order to avoid unnecessary diesel particulate filter failures, there is a need for a diesel particulate filter regeneration method and apparatus which is capable of better determining when to regenerate a diesel particulate filter.

SUMMARY

According to an embodiment disclosed herein, a method of estimating the soot comprises connecting an exhaust pipe to an engine, the exhaust pipe having therein a diesel oxidation catalyst and a diesel particulate filter. A fuel injector device is connected to the exhaust pipe upstream from the diesel oxidation catalyst and diesel particulate filter. A delta exhaust pressure sensor arrangement is configured to measure a difference in exhaust pressure at an inlet to the diesel particulate filter and at an outlet to the diesel particulate filter. At least one controller is connected to the fuel injector and to the delta exhaust pressure sensor arrangement. The at least one controller determines when to conduct an active regeneration of the diesel particulate filter based on an estimated amount of soot accumulated therein. The at least one controller, in a first regeneration mode, causes the fuel injector device to inject fuel at a first rate into the exhaust stream, and re-evaluates soot accumulated within the diesel particulate filter under increased volumetric flow of the exhaust stream. The at least one controller, in a second regeneration mode, causes the fuel injector device to inject fuel at a second rate, larger than the first rate, into the exhaust stream in order to combust soot trapped in the diesel particulate filter.

DETAILED DESCRIPTION

Figure 1:
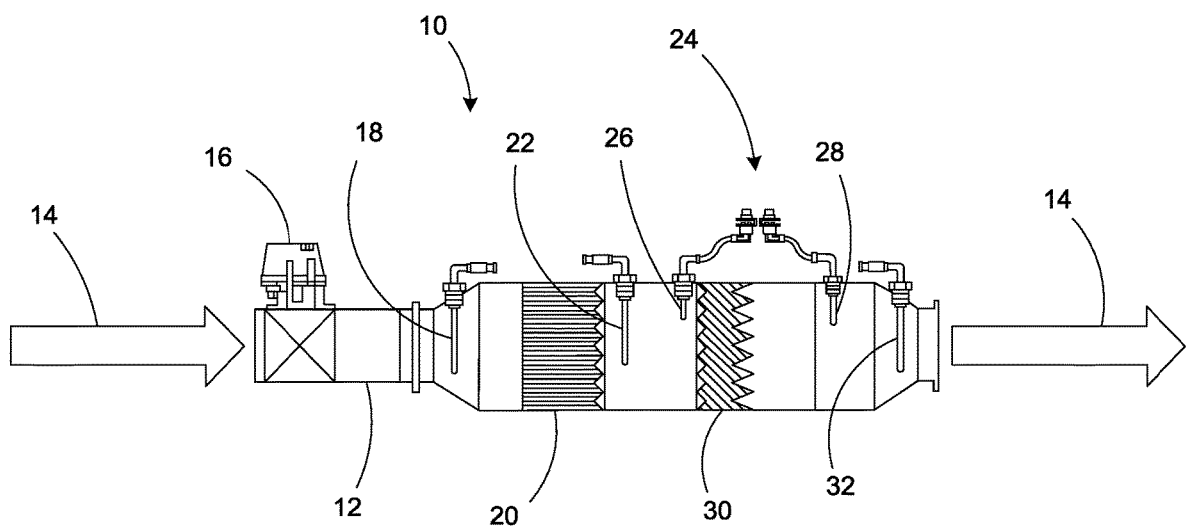
FIG. 1 is a representation of an exhaust system implementing an embodiment of Logic for Improved Delta Pressure Based Soot Estimation in Low Restriction Particulate Filters according to the present disclosure, as described herein.

Embodiments described herein relate to Logic for Improved Delta Pressure Based Soot Estimation in Low Restriction Particulate Filters, and to methods for use thereof. Embodiments of Logic for Improved Delta Pressure Based Soot Estimation in Low Restriction Particulate Filters and method of use may be applied to various types of vehicles having diesel engines, including but not limited to passenger vehicles, recreational vehicles, commercial vehicles, such as highway or semi-tractors with and without auxiliary power units (APUs), straight trucks with and without APUs, buses, fire trucks, agricultural vehicles, construction vehicles, campers, motorhomes, rail travelling vehicles, and trailers with APUs or refrigeration units, for non-limiting example. It is further contemplated that embodiments described herein may be applied to vehicles having hybrid electric drive including diesel engines.

In order to better determine when to conduct active regeneration of the diesel particulate filter by way of fuel injection into the exhaust flow, accurate estimation of the amount of accumulated soot within the diesel particulate filter is desired. However, vehicles having such exhaust systems commonly operate for extended periods of time within operational regimes having generally low exhaust flow cycles, for non-limiting example the operation of a truck driving through a city. This low exhaust flow causes soot estimation to occur at a low volumetric flow, which is when diesel particulate filter delta exhaust pressure sensor inaccuracy has the greatest impact on the overall accuracy of estimation of the amount of accumulated soot within the diesel particulate filter.

Naturally, the Original Equipment Manufacturer (OEM) cannot control the vehicle drive cycle, which may under certain conditions only provide reduced volumetric exhaust flow. The Logic for Improved Delta Pressure Based Soot Estimation in Low Restriction Particulate Filters of the present disclosure solves this issue at least in part by providing an additional process in which, before an active diesel particulate filter regeneration event is initiated, the engine and exhaust aftertreatment system raises temperature of the exhaust passing through the diesel particulate filter. Increasing the temperature of the exhaust passing through the diesel particulate filter lowers the density of the exhaust and thereby increases the volumetric exhaust flow. During this additional process, soot estimation is re-evaluated under increased volumetric flow of the exhaust in order to provide a reliable soot estimation. Once re-evaluation of soot estimation is completed, the Logic for Improved Delta Pressure Based Soot Estimation in Low Restriction Particulate Filters of the present disclosure proceeds with an active regeneration.

More particularly, the Logic for Improved Delta Pressure Based Soot Estimation in Low Restriction Particulate Filters of the present disclosure accomplishes increasing the temperature of the exhaust passing through the diesel particulate filter, and subsequently regenerating the diesel particulate filter, without excessively increasing $NO_2$ emissions.

The method and system of the present disclosure includes a fuel injector device, a diesel oxidation catalyst, and a diesel particulate filter. During a first regeneration mode of the regeneration process, the fuel injection device injects fuel into the exhaust stream at a first rate. The injected fuel enters the diesel oxidation catalyst and favorably occupies catalytic reaction sites therein to reduce NO occupancy of the same sites, and thereby reduce the amount of NO that is oxidized to $NO_2$, while increasing the exhaust temperature and volumetric flow.

At a determined time, such as when the exhaust backpressure becomes excessive, or at a predetermined time interval, a second regeneration mode is initiated wherein fuel is injected at a second rate into the exhaust stream. During the second regeneration mode, the fuel that has been injected into the exhaust stream oxidizes within the diesel oxidation catalyst. This raises the exhaust temperature sufficiently to combust soot trapped on the diesel particulate filter. It is envisioned that exhaust temperature enables combustion of substantially all soot trapped on the diesel particulate filter. In this way, the method and system of the present disclosure enables increasing exhaust temperature and volumetric flow for the purpose of diesel particulate filter delta pressure soot estimation revalidation, and enables regeneration of the diesel particulate filter without substantially increasing $NO_2$ emissions.

It is noted that the first rate at which the fuel injection device injects fuel into the exhaust stream during the first regeneration mode of the regeneration process may be anywhere from five percent to ninety-five percent of the second rate at which the fuel injection device injects fuel into the exhaust stream during the second regeneration mode of the regeneration process, provided that the first rate at which the fuel injection device injects fuel into the exhaust stream during the first regeneration mode of the regeneration process is not sufficient to combust substantially all of the soot trapped on the diesel particulate filter.

Moreover, the Logic for Improved Delta Pressure Based Soot Estimation in Low Restriction Particulate Filters of the present disclosure determines diesel particulate filter delta pressure based soot estimation during all modes of vehicle operation except during active particulate filter regeneration itself. The results of the diesel particulate filter delta pressure based soot estimation determined during ordinary modes of vehicle operation, including those determined during operational regimes having generally low exhaust flow cycles, are then compared to the diesel particulate filter delta pressure based soot estimation performed during increased volumetric exhaust flow. In this way, the Logic for Improved Delta Pressure Based Soot Estimation in Low Restriction Particulate Filters of the present disclosure re-validates the soot estimation and further refines correlation between diesel particulate filter delta pressure readings under various conditions, and actual accumulation of soot within the diesel particulate filter.

The Logic for Improved Delta Pressure Based Soot Estimation in Low Restriction Particulate Filters of the present disclosure may be implemented within a vehicle control unit or module, within an engine control unit or module, and/or within an exhaust aftertreatment control unit or module. The system and method of the present disclosure may further use recursive machine learning, up to and including artificial intelligence and neural networking, in refining the correlation between diesel particulate filter delta pressure readings under various conditions, diesel particulate filter delta pressure readings under increased exhaust temperature and volumetric exhaust flow during the first regeneration mode, and actual accumulation of soot within the diesel particulate filter.

In order to facilitate this, the system and method of the present disclosure may further be provided with temperature sensors positioned subsequent to the fuel injection device but prior to the diesel oxidation catalyst, subsequent to the diesel oxidation catalyst but prior to the diesel particulate filter, and subsequent to the diesel particulate filter. In this way, the Logic for Improved Delta Pressure Based Soot Estimation in Low Restriction Particulate Filters of the present disclosure is provided with temperature and volumetric exhaust flow data at each point in the system, and delta exhaust pressure across the diesel particulate filter, under each of these operating conditions, including during the regeneration itself. The temperature sensor positioned subsequent to the diesel particulate filter in particular provides important information regarding the combustion of accumulated soot within the diesel particulate filter. This temperature information is used by the Logic for Improved Delta Pressure Based Soot Estimation in Low Restriction Particulate Filters of the present disclosure to further validate and refine the estimation of soot accumulation within the diesel particulate filter.

Embodiments of the Logic for Improved Delta Pressure Based Soot Estimation in Low Restriction Particulate Filters of the present disclosure and their method of use allow the OEM to use a lower restriction diesel particulate filter while improving soot estimation for the purposes of determining when to regenerate the diesel particulate filter in such a way as to reduce unnecessary diesel particulate filter regeneration, despite operation of the vehicle in regimes having generally low exhaust flow cycles. This further results in the ability to operate vehicles with generally lower overall exhaust restriction and improved energy efficiency and fuel economy. Moreover, the system and method of the present disclosure provides such a powertrain arrangement that provides improved fuel economy without resulting in vehicle repair and warranty issues.

Referring now to FIG. 1, an embodiment of an exhaust system 10 implementing the Logic for Improved Delta Pressure Based Soot Estimation in Low Restriction Particulate Filters of the present disclosure is shown. The exhaust system 10 includes an exhaust pipe 12 having exhaust flow 14 passing therethrough. The exhaust system 10 further includes a diesel oxidation catalyst 20 and a diesel particulate filter 30. The diesel oxidation catalyst 20 functions to convert particulate matter, hydrocarbons, and carbon monoxide to carbon dioxide and water. A selective catalytic reduction (SCR) system (not shown) that uses a reagent such as ammonia to reduce NOx into nitrogen and water may be present. If an SCR system is present, ammonia is supplied to the catalyst system by the injection of urea, sometimes referred to as Diesel Emissions Fluid (DEF), into the exhaust, which then undergoes thermal decomposition and hydrolysis into ammonia. Because diesel engine exhaust contains relatively high levels of particulate matter, catalytic converters remove only 20-40% of particulate matter. The diesel particulate filter 30 then functions to clean the remainder of the particulates from the exhaust flow 14 prior to release into the atmosphere.

The exhaust system 10 implementing the Logic for Improved Delta Pressure Based Soot Estimation in Low Restriction Particulate Filters of the present disclosure is further provided with a hydrocarbon (fuel) injector device 16 upstream of the diesel oxidation catalyst 20. A first exhaust temperature sensor 18 is located at or near the inlet of the diesel oxidation catalyst 20. A second exhaust temperature sensor 22 is located between the outlet of the diesel oxidation catalyst 20 and the inlet of the diesel particulate filter 30. A third exhaust temperature sensor 32 is located at the outlet of the diesel particulate filter 30. A first exhaust pressure sensor 26 is located at the inlet of the diesel particulate filter 30, and a second exhaust pressure sensor 28 is located at the outlet of the diesel particulate filter 30. Together, the first exhaust pressure sensor 26 and the second exhaust pressure sensor 28 function as a delta exhaust pressure sensor 24.

As discussed previously, before the Logic for Improved Delta Pressure Based Soot Estimation in Low Restriction Particulate Filters of the present disclosure initiates an active diesel particulate filter regeneration event, the system and method raises the temperature of the exhaust flow 14 passing through diesel particulate filter 30. During this first regeneration mode, the hydrocarbon (fuel) injector device 16 injects fuel into the exhaust flow 14 at a relatively smaller rate. This increases the temperature of the exhaust flow 14 passing through the diesel particulate filter 30, thereby increasing the volumetric exhaust flow. Ongoing estimation of the soot within the diesel particulate filter 30 performed during ordinary modes of vehicle operation using the delta exhaust pressure sensor arrangement 24 is then re-evaluated under increased volumetric flow of the exhaust flow 14 through the diesel particulate filter 30 in order to ensure the soot estimation is accurate. Once re-evaluation of soot estimation within the diesel particulate filter 30 is completed, the Logic for Improved Delta Pressure Based Soot Estimation in Low Restriction Particulate Filters of the present disclosure proceeds with an active regeneration of the diesel particulate filter 30 in a second regeneration mode. In this way, the Logic for Improved Delta Pressure Based Soot Estimation in Low Restriction Particulate Filters of the present disclosure further refines the correlation between diesel particulate filter delta pressure readings taken using the delta exhaust pressure sensor arrangement 24 under various conditions, and actual accumulation of soot within the diesel particulate filter 30 as re-evaluated during the first regeneration mode.

Figure 2:
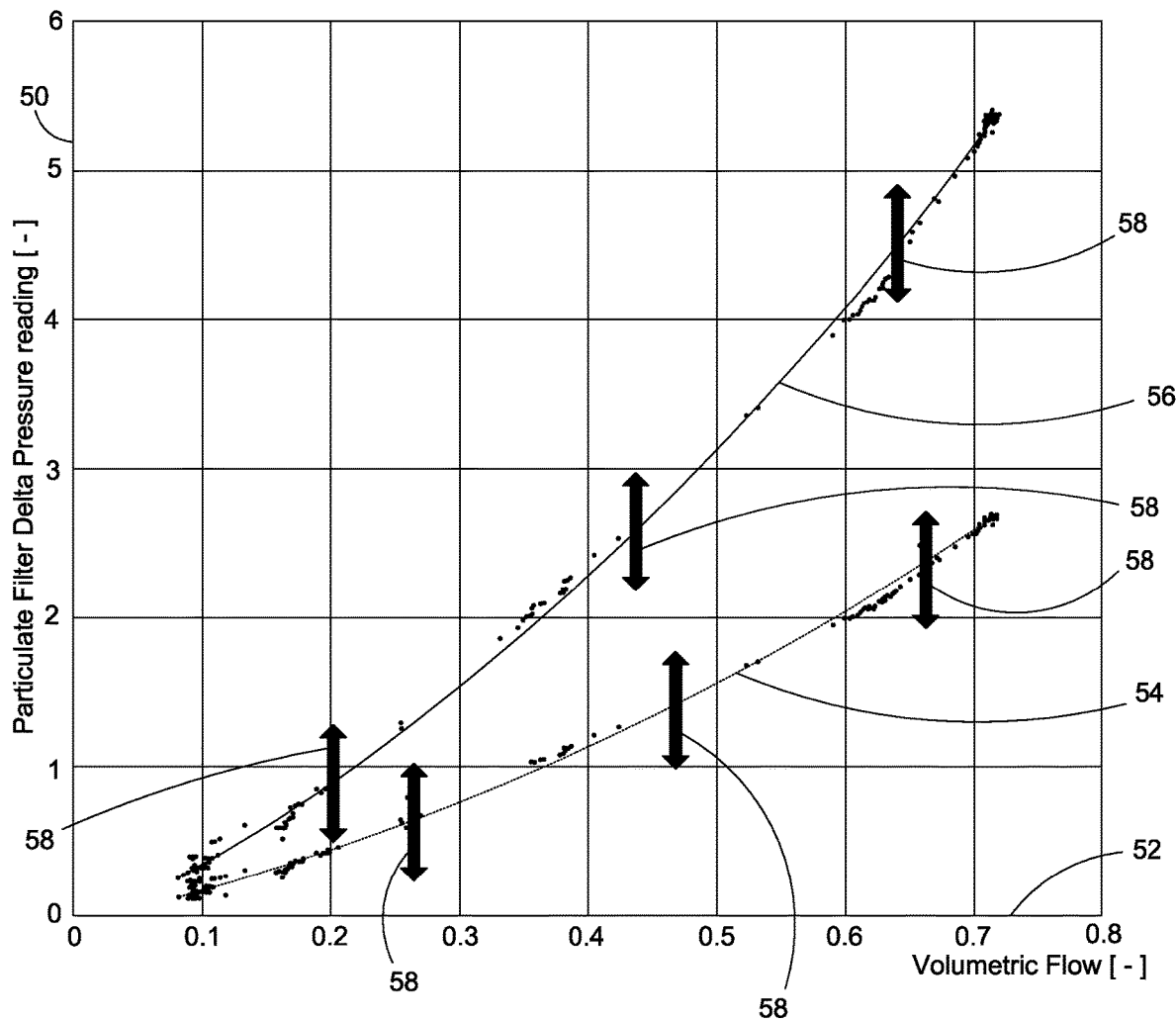
FIG. 2 is a graph of particulate filter delta exhaust pressure versus volumetric exhaust flow rate for a clean diesel particulate filter and for a soot loaded diesel particulate filter, as described herein.

FIG. 2 illustrates how higher volumetric flow rate of the exhaust produces higher accuracy pressure based soot estimation, due to sensor error having a smaller relative impact. Specifically, FIG. 2 is a graph of volumetric flow rate lines for a clean diesel particulate filter and for a dirty diesel particulate filter. The Y-axis is the particulate filter delta exhaust pressure reading axis 50, and the X-axis is the volumetric exhaust flow rate axis 52. A clean diesel particulate filter delta exhaust pressure to volumetric flow rate line 54 is shown along with a soot loaded diesel particulate filter delta exhaust pressure to volumetric flow rate line 56. The delta exhaust pressure sensor arrangement 24, like all sensors, has an accuracy range, represented at several points along the clean diesel particulate filter delta exhaust pressure to volumetric flow rate line 54 and along the soot loaded diesel particulate filter delta exhaust pressure to volumetric flow rate line 56 as delta exhaust pressure sensor accuracy ranges 58. As can be seen at low volumetric exhaust flow rates, the significance of the delta exhaust pressure sensor accuracy ranges 58 is much greater than at high volumetric exhaust flow rates.

Figure 3A:
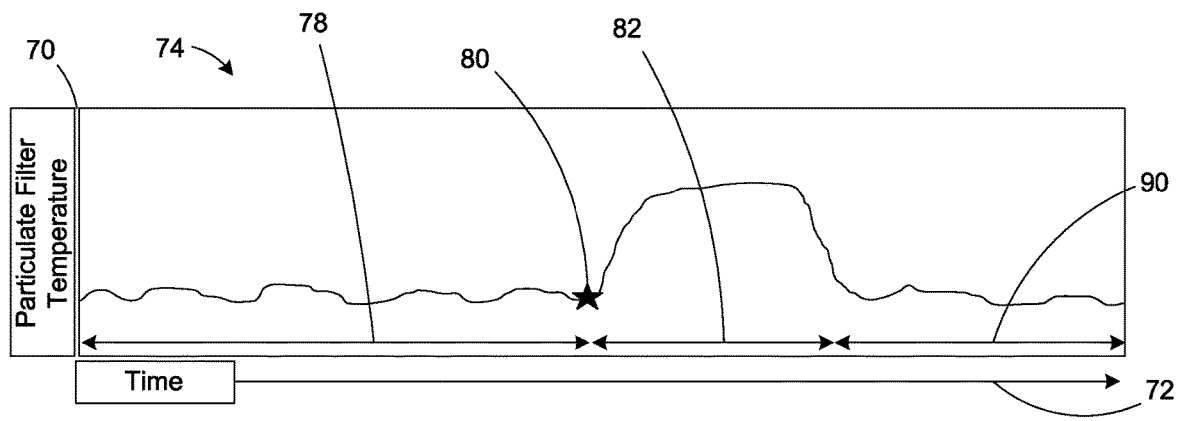
FIG. 3A is a graph of diesel particulate filter temperature over time for an exhaust system implementing a known soot estimation sequence, as described herein.
Figure 3B:
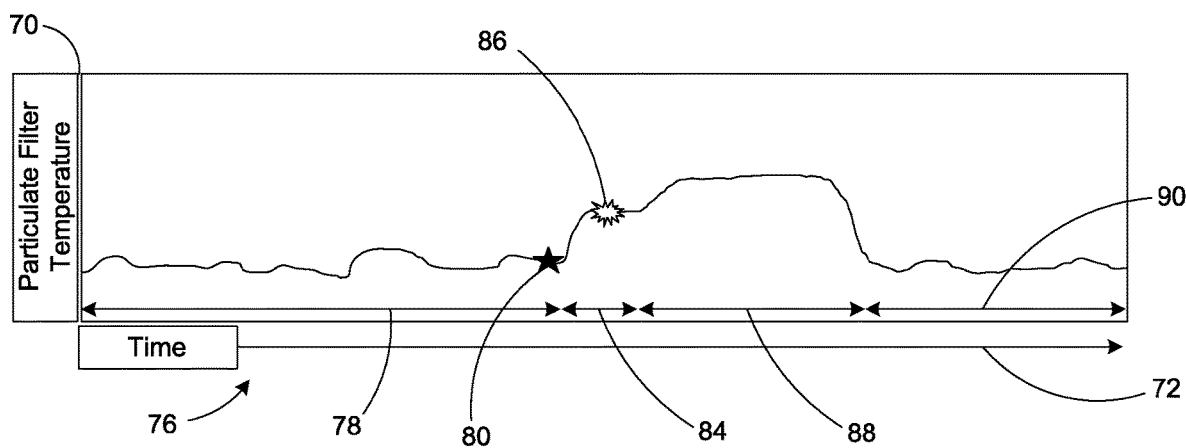
FIG. 3B is a graph of diesel particulate filter temperature over time for an exhaust system implementing an embodiment of the Logic for Improved Delta Pressure Based Soot Estimation in Low Restriction Particulate Filters according to the present disclosure, as described herein.

Referring now to FIGS. 3A and 3B, a known soot estimation sequence 74 and a soot estimation sequence utilizing Logic for Improved Delta Pressure Based Soot Estimation in Low Restriction Particulate Filters 76 are shown, respectively. Both graphs show a diesel particulate filter temperature axis 70 and a time axis 72, and illustrate the events of the soot estimation sequences 74 and 76. In both soot estimation sequences 74 and 76, an initial period of normal operation 78 is followed by a regeneration trigger based upon soot estimation 80. In the known soot estimation sequence 74, the regeneration trigger based upon soot estimation 80 is followed directly by a period of active regeneration 82. In the soot estimation sequence utilizing Logic for Improved Delta Pressure Based Soot Estimation in Low Restriction Particulate Filters 76, the regeneration trigger based upon soot estimation 80 is followed by a first regeneration mode, being a period of increased exhaust temperature and volumetric exhaust flow 84.

Once increased exhaust temperature and volumetric exhaust flow is established, soot estimation validation at conditions for accuracy 86 occurs. As discussed previously, ongoing estimation of the soot within the diesel particulate filter (not shown) performed during ordinary modes of vehicle operation using the delta exhaust pressure sensor arrangement (not shown) is then re-evaluated under increased volumetric flow of the exhaust flow through the diesel particulate filter in order to ensure the soot estimation is accurate. Once this is complete, a second regeneration mode/period of active regeneration 88 occurs. In both of the known soot estimation sequence 74 and the soot estimation sequence utilizing Logic for Improved Delta Pressure Based Soot Estimation in Low Restriction Particulate Filters 76, the period of active regeneration 82 and 88 is followed by a period of normal operation 90. While the Logic for Improved Delta Pressure Based Soot Estimation in Low Restriction Particulate Filters has been described with respect to at least one embodiment, the arrangement and method can be further modified within the spirit and scope of this disclosure, as demonstrated previously. This application is therefore intended to cover any variations, uses, or adaptations of the system and method using its general principles. Further, this application is intended to cover such departures from the present disclosure as come within known or customary practice in the art to which the disclosure pertains and which fall within the limits of the appended claims.

What is claimed is:

1. A method of estimating accumulated soot within a diesel particulate filter of an exhaust system of a vehicle based on delta pressure, comprising the steps of:
   connecting an exhaust pipe to an engine, the exhaust pipe having therein a diesel oxidation catalyst and a diesel particulate filter;
   connecting a fuel injector device to the exhaust pipe upstream from the diesel oxidation catalyst and the diesel particulate filter;
   configuring a delta exhaust pressure sensor arrangement to measure a difference in exhaust pressure at an inlet to the diesel particulate filter and at an outlet to the diesel particulate filter; and
   connecting at least one controller to the fuel injector and to the delta exhaust pressure sensor arrangement, and configuring the at least one controller to:
   1.) determine when to conduct an active regeneration of the diesel particulate filter based on an estimated amount of soot accumulated therein;
   2.) in a first regeneration mode, cause the fuel injector device to inject fuel at a first rate into the exhaust stream, and re-evaluate the amount of soot accumulated within the diesel particulate filter under increased volumetric flow of the exhaust stream; and
   3.) in a second regeneration mode, cause the fuel injector device to inject fuel at a second rate into the exhaust stream in order to combust substantially all of the soot trapped in the diesel particulate filter.

2. The method of claim 1, further comprising the steps of:
   configuring the at least one controller to at least one of:
   re-evaluate the amount of soot accumulated within the diesel particulate filter during the first regeneration mode to ensure the soot estimation is accurate;
   compare the re-evaluated amount of soot from the first regeneration mode with the initial estimated amount of soot; and
   further refine a correlation between diesel particulate filter delta pressure readings under operating conditions, and actual accumulation of soot as determined during the first regeneration mode.

3. The method of claim 2, further comprising the steps of:
   connecting the at least one controller to at least one temperature sensor positioned at least one of:
   subsequent to the fuel injection device but prior to the diesel oxidation catalyst,
   subsequent to the diesel oxidation catalyst but prior to the diesel particulate filter, and
   subsequent to the diesel particulate filter.

4. The method of claim 3, further comprising the steps of:
   configuring the at least one controller to, when in the first regeneration mode, cause the fuel injector device to inject fuel into the exhaust stream at the first rate calculated to enter the diesel oxidation catalyst and favorably occupy catalytic reaction sites therein to reduce NO occupancy of the same sites, and to reduce the amount of NO that is oxidized to $NO_2$, while increasing exhaust temperature and volumetric flow.

5. The method of claim 4, wherein:
   the first rate at which the fuel injection device injects fuel into the exhaust stream during the first regeneration mode being from five percent to ninety-five percent of the second rate at which the fuel injection device injects fuel into the exhaust stream during the second regeneration mode, provided that the first rate is not sufficient to combust soot trapped on the diesel particulate filter.

6. The method of claim 5, wherein:
the at least one controller is at least one of:
　a vehicle control unit or module,
　an engine control unit or module, and
　an exhaust aftertreatment control unit or module.

* * * * *